US012561599B2

(12) United States Patent
Fischbacher et al.

(10) Patent No.: US 12,561,599 B2
(45) Date of Patent: Feb. 24, 2026

(54) NETWORK DEPTH-MINIMIZING QUANTUM COMPILER

(71) Applicant: Google LLC, Mountain View, CA (US)

(72) Inventors: Thomas Fischbacher, Thalwil (CH); Luca Versari, Zurich (CH)

(73) Assignee: Google LLC, Mountain View, CA (US)

( * ) Notice: Subject to any disclaimer, the term of this patent is extended or adjusted under 35 U.S.C. 154(b) by 627 days.

(21) Appl. No.: 17/959,962

(22) Filed: Oct. 4, 2022

(65) Prior Publication Data

US 2023/0115065 A1 Apr. 13, 2023

Related U.S. Application Data

(60) Provisional application No. 63/262,320, filed on Oct. 8, 2021.

(51) Int. Cl.
*G06F 9/44* (2018.01)
*G06N 10/80* (2022.01)

(52) U.S. Cl.
CPC .................................... *G06N 10/80* (2022.01)

(58) Field of Classification Search
CPC ...................................................... G06N 10/80
USPC ........................................................ 717/140
See application file for complete search history.

(56) References Cited

U.S. PATENT DOCUMENTS

| | | | | | |
|---|---|---|---|---|---|
| 9,791,258 | B2 * | 10/2017 | Mower | .................. | G06N 10/40 |
| 11,386,347 | B2 * | 7/2022 | Low | ....................... | B82Y 10/00 |
| 12,020,117 | B2 * | 6/2024 | Javadiabhari | .......... | G06N 10/20 |
| 2006/0123363 | A1 * | 6/2006 | Williams | ............... | G06N 10/20 |
| | | | | | 977/839 |
| 2021/0096443 | A1 * | 4/2021 | Dhand | .................... | G06E 1/045 |
| 2023/0115065 | A1 * | 4/2023 | Fischbacher | .......... | G06N 10/80 |
| | | | | | 717/140 |

OTHER PUBLICATIONS

Mottonen, "Decompositions of general quantum gates", (hereinafter Mottonen), Apr. 14, 2005, pp. 1-25, [online][retrieved on Jun. 25, 2025]. Retrieved from < https://arxiv.org/pdf/quant-ph/0504100> (Year: 2005).*
N. Tischler, "Quantum Optical Realization of Arbitrary Linear Transformations Allowing for Loss and Gain", Apr. 13, 2018, 13 pages, [online], [retrieved on Jun. 25, 2025]. Retrieved from <https://journals.aps.org/prx/abstract/10.1103/PhysRevX.8.021017> (Year: 2018 ).*
PCT International Search Report and Written Opinion for International Application No. PCT/US2022/045939, mailed Jan. 27, 2023, 16 pages.

(Continued)

*Primary Examiner* — Evral E Bodden
(74) *Attorney, Agent, or Firm* — Lowenstein Sandler LLP

(57) ABSTRACT

Implementations disclosed describe techniques used for compiling a quantum algorithm for execution on a plurality of quantum circuits, including accessing, by a processing device, the quantum algorithm, identifying a matrix associated with the quantum algorithm, determining a representation of the identified matrix as a matrix decomposition that includes a plurality of transformation matrices, wherein one or more of the plurality of transformation matrices perform multiple instances of two-dimensional rotations; and generating a circuit map that maps execution of the matrix decomposition on the plurality of quantum circuits.

21 Claims, 8 Drawing Sheets

(56) References Cited

OTHER PUBLICATIONS

Nora Tischler et al: "Quantum optical realization of arbitrary linear transformations allowing for loss and gain", arxiv.org, Cornell University Library, 201 Olin Library Cornell University Ithaca, NY 14853, Apr. 15, 2018 (Apr. 15, 2018), XP081314046, DOI: 10.1103/ PHYSREVX.8.021017, 13 pages.

Fischbacher et al., "Single-Photon Image Classification," Published as a conference paper at International Conference on Learning Representations (ICLR), Mar. 12, 2021, 14 pages.

Krol et al,. "Efficient decomposition of unitary matrices in quantum circuit compilers," arXiv:2101.02993v1, Jan. 8, 2021, 13 pages.

Reck et al., "Experimental Realization of Any Discrete Unitary Operator," The American Physical Society, vol. 73, No. 1, Jul. 4, 1994, 6 pages.

* cited by examiner

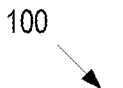
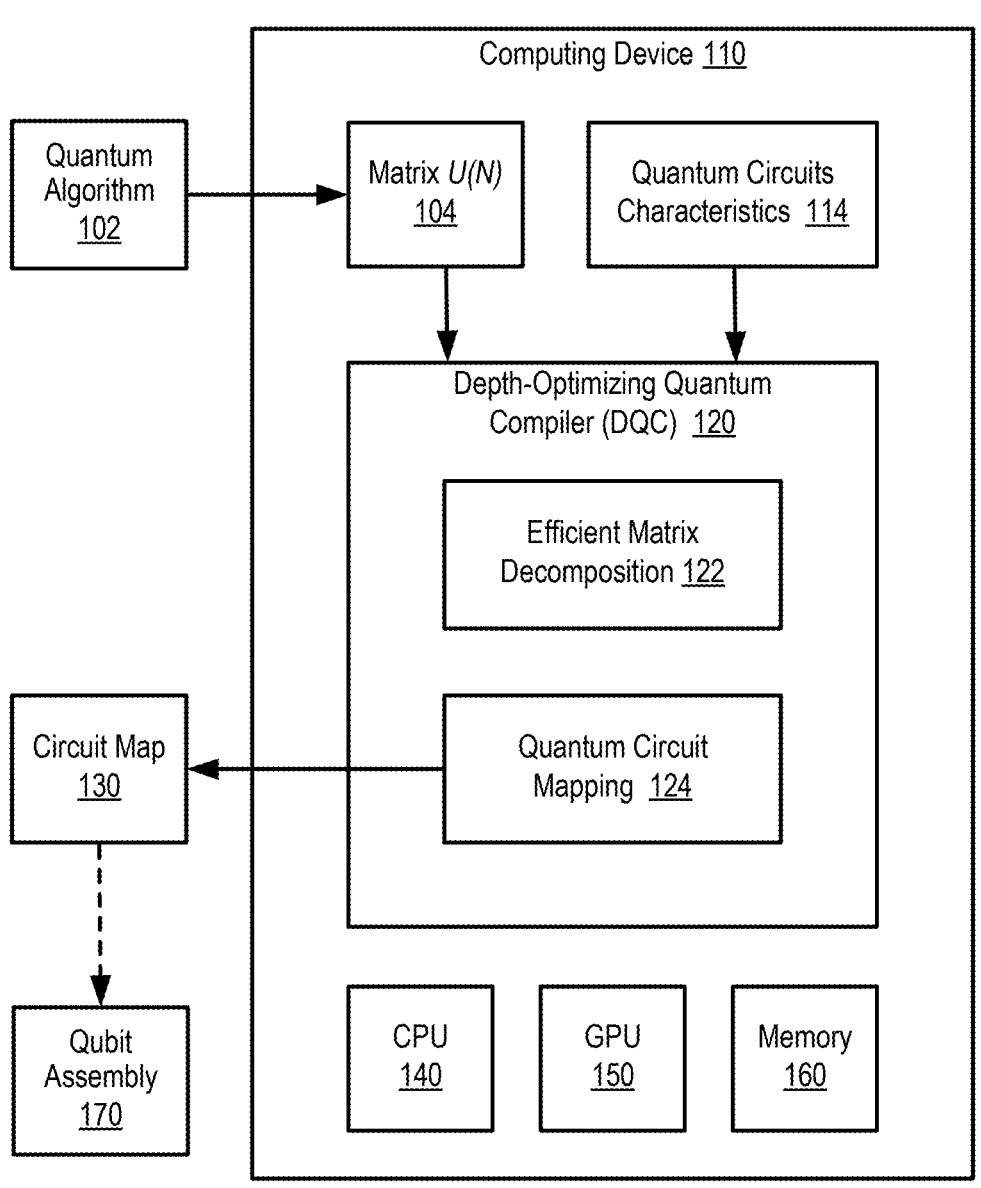
FIG. 1A

101

Control & Measurement System 180

Processor
184

Memory
186

I/O Unit
182

190

Qubit Assembly 170

172

174

192

$$T_6 \times T_5 \times T_4 \times$$

$$T_9 \times T_8 \times T_7 \times$$

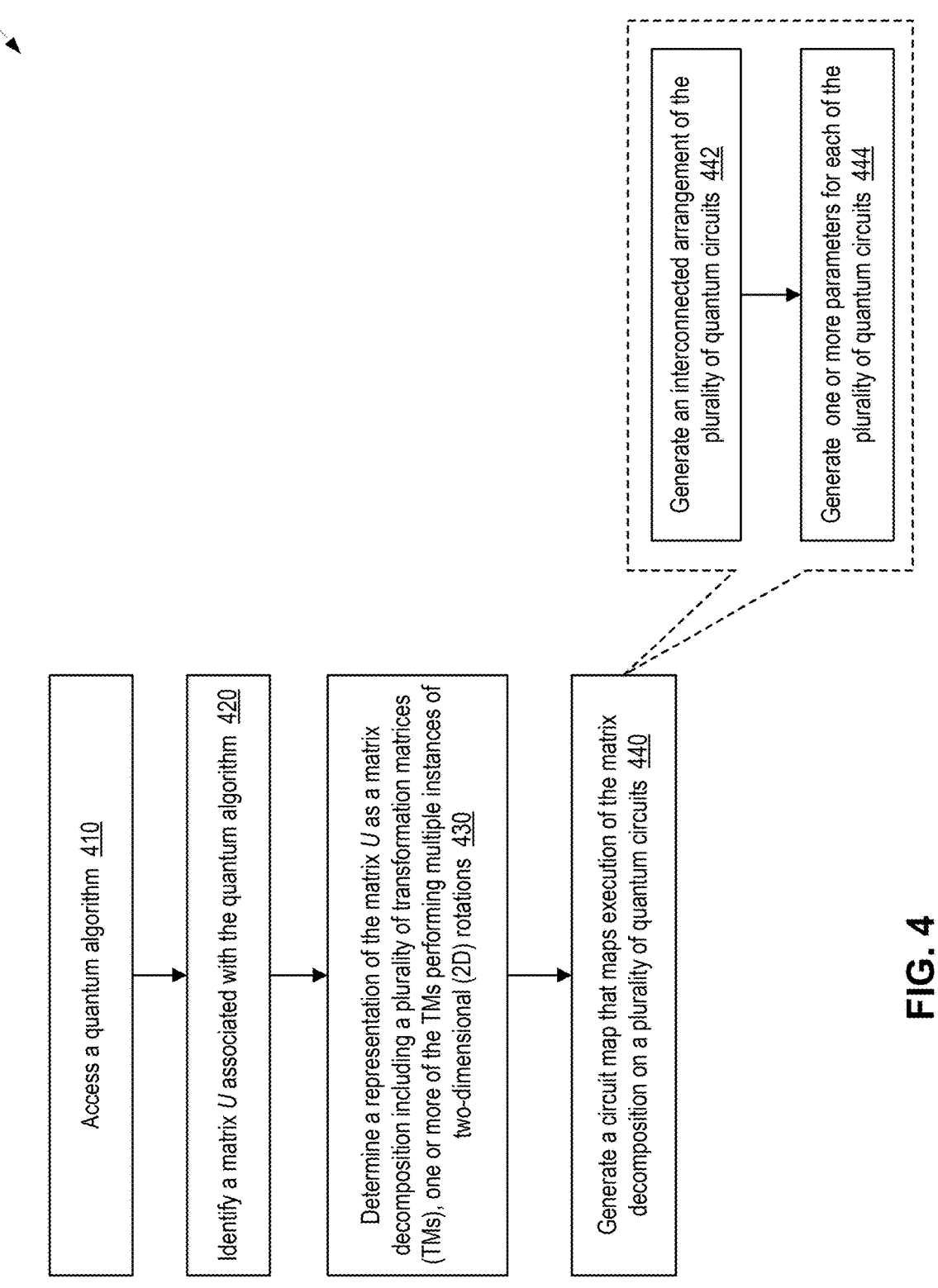

400

Access a quantum algorithm 410

Identify a matrix $U$ associated with the quantum algorithm 420

Determine a representation of the matrix $U$ as a matrix decomposition including a plurality of transformation matrices (TMs), one or more of the TMs performing multiple instances of two-dimensional (2D) rotations 430

Generate a circuit map that maps execution of the matrix decomposition on a plurality of quantum circuits 440

Generate an interconnected arrangement of the plurality of quantum circuits 442

Generate one or more parameters for each of the plurality of quantum circuits 444

FIG. 4

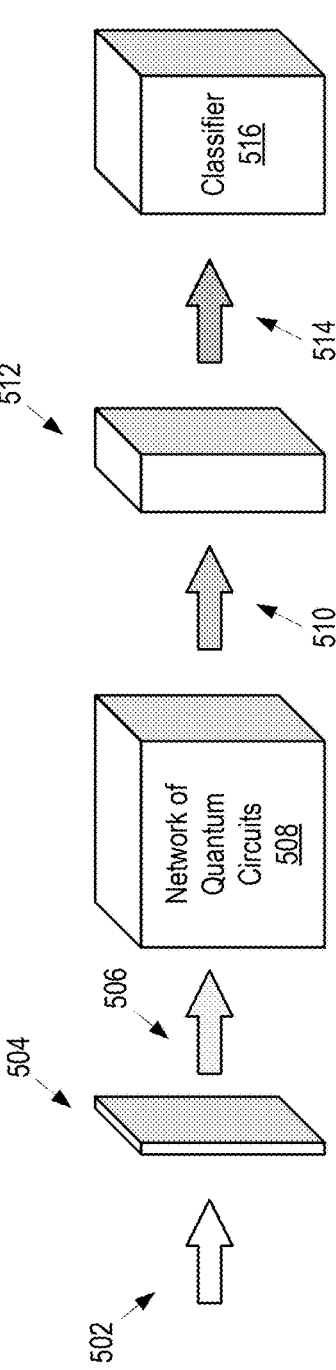
FIG. 5

NETWORK DEPTH-MINIMIZING QUANTUM COMPILER

RELATED APPLICATIONS

This application claims the benefit of U.S. Provisional Application No. 63/262,320, filed Oct. 8, 2021, the entire contents of which is being incorporated herein by reference.

TECHNICAL FIELD

Aspects and implementations of the present disclosure relate to systems and methods for optimized implementations of quantum algorithms on digital and analog physical systems.

BACKGROUND

Quantum computers operate by manipulating quantum bits (qubits or qutrits). Qubits are quantum systems that can be in a superposition state $\alpha|0\rangle + \beta|1\rangle$ of quantum states, $|0\rangle$ and $|1\rangle$. Similarly, qutrits may be in a superposition of three quantum states, $|0\rangle$, $|1\rangle$ and $|2\rangle$ and, more generally, qudits may be in a superposition of an arbitrary number of quantum states. Unlike classical bits, which always remain in one of the two classical states, 0 or 1, qubits (or qudits) can have continuously varying amplitudes $\alpha$ and $\beta$. Evolution of a quantum system is described by a unitary operator. Likewise, a quantum algorithm amounts to a sequence of unitary operators applied to initial states of qubits (or qudits) with the output of the quantum algorithm determined from the final states of the qubits (or qudits). As a result, a quantum algorithm can potentially be implemented via an evolution of a physical system that includes an appropriate number of circuits (qubit/qudit realizations) that maintain coherence over the time of the evolution. The output of the quantum algorithm may then be read out by performing a measurement of the final state of the circuits. Systems implementing quantum computers can be superior to classical computers for solving a number of problems that are not practicable on classical computers.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

The subject matter of the disclosure relates to a quantum compiler that uses, as an input, a target quantum algorithm and information about quantum circuits available for implementation of the target quantum algorithm. The quantum complier analyses the target quantum algorithm and optimizes execution of the target quantum algorithm on the available quantum circuits by minimizing a number of layers of operations, various layers including operations of multiple quantum circuits that can be performed in parallel. The quantum compiler generates a circuit map that specifies such as arrangement of interconnected quantum circuits as well as parameters of the quantum circuits that are to execute the target algorithm.

According to one aspect of the present disclosure there is provided a method that includes accessing, by a processing device, a quantum algorithm to be compiled for execution on a plurality of quantum circuits.

The method may also include identifying, by the processing device, a matrix associated with the quantum algorithm.

The method may also include determining, by the processing device, a representation of the identified matrix as a matrix decomposition comprising a plurality of transformation matrices (TMs), wherein one or more of the plurality of TMs perform multiple instances of complex two-dimensional (2D) rotations.

The method may also include generating, by the processing device, a circuit map that maps execution of the matrix decomposition on the plurality of quantum circuits.

According to another aspect of the present disclosure there is provided a system comprising one or more apparatus, the one or more apparatus configured to carry out the method described herein above. The system may comprise a memory and a processing device coupled to the memory, the processing device to perform various actions of "identifying" and "determining."

According to another aspect of the present disclosure there is provided a non-transitory computer-readable medium to store instructions, which when executed by a processing device, cause the processing device to carry out the method described herein above.

BRIEF DESCRIPTION OF THE DRAWINGS

The present disclosure will be understood more fully from the detailed description given below and from the accompanying drawings of various implementations of the disclosure.

FIG. 1A illustrates an example system architecture, in accordance with one implementation of the present disclosure.

FIG. 2A shows an initial matrix undergoing a first transformation. FIG. 2B shows the resulting matrix undergoing a second transformation. FIG. 2C shows the next resulting matrix undergoing a third transformation. FIG. 2D and FIG. 2E illustrate subsequent recursive operations.

FIG. 3A depicts a realization of the first nine transformation matrices $T_1 \ldots T_9$. FIG. 3B depicts a realization of the last seven transformation matrices (for N=8) $T_{10} \ldots T_{17}$ and the diagonal matrix D.

FIG. 4 depicts a flow diagram of an example method of a depth-efficient compiling of a quantum algorithm, in accordance with some implementations of the present disclosure.

FIG. 5 illustrates an example application of a depth-efficient network of quantum circuits in machine learning, in accordance with some implementations of the present disclosure.

DETAILED DESCRIPTION

Figure 1B:
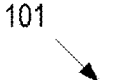
FIG. 1B depicts an example system for implementing a depth-optimized compiled quantum algorithm, in accordance with one implementation of the present disclosure.

Like classical computing, quantum computing of complex codes may involve a stack of multiple processing layers. Each layer of quantum processing may be implemented via a collection of qubits, qudits, or any suitable quantum systems and may introduce a certain degree of decoherence to quantum states of the processing layers, which may accumulate across the stack and be detrimental for reliable quantum computing. Whereas classical computing systems may rely on thermodynamic non-linearities (e.g., for dumping entropy to available reservoirs), any such thermodynamic interactions introduce additional decoherence of quantum computing systems. As a result, various elaborate quantum error correction codes have to be engineered to minimize effects of accumulated decoherence. Successful implementation of error correction codes, however, is still a significant technological challenge. This impedes implementation of quantum codes that use large-depth quantum processing stacks. Therefore, minimizing the depth of quantum processing stacks is important for quantum computing applications.

Unitary transformations determine how a state of a coherent quantum system evolves with time. A system that is initially, at time t=0, in a state $|\psi(0)\rangle$ transitions to a state $|\psi(t)\rangle$, at time t>0, according to a transformation, $|\psi(t)\rangle = U_t|\psi(0)\rangle$, determined by a unitary operator Ut that can be obtained as a solution of quantum Schroedinger's equation describing the behavior of the quantum system. States $|\psi(0)\rangle$ and $|\psi(t)\rangle$ can be considered as vectors in the abstract Hilbert space of the quantum system. Quantum computing typically utilizes systems whose Hilbert spaces have a finite (countable) number of dimensions N. For example, a single two-state qubit (e.g., spin-up/spin-down system) has a two-dimensional (N=2) Hilbert space. In general, a quantum system that is suitable for quantum computing may have a Hilbert space with an arbitrary number of dimensions. Once a basis of elemental vectors is selected for the N-dimensional Hilbert space of a quantum system, states $|\psi(0)\rangle$ and $|\psi(t)\rangle$ can be represented as N-component vectors (e.g., column vectors) and the operator U can be represented as a unitary matrix U(N) (omitting henceforth the subscript t for conciseness). The unitarity of the matrix, $U(N)U^\dagger(N)=1$, implies that evolution of the quantum system amounts to a rotation of the vector state of the system in its Hilbert space in such a way that preserves the length of this vector state. Unitary transformations also determine evolution of non-coherent or partially coherent quantum states described by a density matrix $$\rho, \text{ e.g., } \rho_t = U_t^\dagger \rho_0 U_t,$$

unless some form of a measurement takes place.

Quantum algorithms operate with mathematical vectors in an N-dimensional space. Any linear operation on such states can be represented via a suitably chosen matrix, which is a unitary matrix if the lengths of the vectors are fixed. Conversely, the output of a quantum algorithm can be realized by an appropriately chosen physical system whose Hilbert space has the same number of dimensions N and whose evolution is described by the same unitary matrix. It has been proven (see M. Reck et al., *Experimental Realization of Any Discrete Unitary Operator*, Physical Review Letters, vol. 73, p. 58 (American Physical Society, 1994)) that any unitary matrix can be represented by (decomposed into) a product of elemental transformation matrices, each transformation matrix rotating the vector state of the quantum system within a two-dimensional (2D) coordinate-aligned sub-space of the system's Hilbert space while leaving the other N−2 components of the state vector unchanged. Such elemental 2D rotations may be described by a transformation matrix, e.g., $$T = \begin{pmatrix} t & re^{i\phi} \\ re^{-i\phi} & t \end{pmatrix},$$

in which $t^2+r^2=1$, and parameters t, r and $\phi$ are chosen as real. Such a transformation can be realized by a physical system having a two-port input and a two-port output and a small number of hardware components. For example, matrix T may be implemented as an interferometer having one or more beam splitters or phase shifters. The amplitude t characterizes a process in which a photon enters through input port 1 (or input port 2) and exits through output port 1 (or output port 2), with the probability of such process given by $t^2$ (or, more generally, $|t|^2$). Similarly, the amplitude $re^{i\phi}$ characterizes a process in which a photon enters through input port 2 and exits through port 1, with the probability of such process given by $r^2$ (or, more generally, $|r|^2$). The values t and r and phase shift $\phi$ can be controlled by selecting suitable parameters of the beam splitters and phase shifters.

Decomposition of an arbitrary matrix U(N) into a product of matrices based on elemental complex 2D rotations T makes use of the fact that by appropriately selecting the two independent parameters t and $\phi$, it is possible to bring one element of the resulting product matrix (both the element's real and imaginary parts) to a zero value. Correspondingly, by applying a series of N−1 such rotations, all N−1 non-diagonal elements of a first row of the matrix U(N) can be made zero. (Because of the unitarity of the matrix U(N), the non-diagonal elements of the first column are also made zeros automatically.) Similarly, next N−2 2D rotations can eliminate all non-diagonal elements of the second row of the matrix U(N), and so on. As a result, the maximum of N (N−1)/2 elemental 2D rotations are sufficient to bring the matrix U(N) to a diagonal form, U(N)→D. Because the obtained diagonal matrix is still unitary, its remaining elements are of the form $e^{i\alpha}$ and can be realized using N independent phase shifters.

The described decomposition can be realized via a network of coupled physical circuits (e.g., optical circuits). The resulting network depth, however, is of the order $O(N^2)$ and can be very large for large dimension N of the Hilbert space, which may be of the order of hundreds, thousands, or even more. This may be challenging and costly to implement in an actual physical system while at the same time ensuring quantum coherence over such long paths through the network (e.g., optical paths of photons).

Aspects and implementations of the present disclosure address these and other shortcomings of the existing technology by describing techniques for minimizing a network depth of the system that realizes a given quantum algorithm using only $O(N \log_2 N)$ layers of transformations. Implementations disclosed herein are directed to a compiler for a quantum computer (herein referred to as a quantum compiler) that identifies one or more unitary matrices U(N) that implement a quantum algorithm, decomposes the matrix (or matrices)U(N) into a product of $O(N \log_2 N)$ number of matrices performing one or more 2D rotations, and produces a map of quantum circuits that implements the identified matrix U(N). Each of the transformation matrices may perform multiple 2D rotations in parallel. For example, a first transformation may be applied, in parallel, to pairs of odd/even elements of the last column of the matrix U(N) causing odd elements to turn to zero. A second transformation may be applied in a similar fashion to the remaining elements of the last column. As a result, if the size of the last column is a power of two, $N=2^k$, the first transformation eliminates $2^{k-1}$ elements of the last column, the second transformation eliminates $2^{k-2}$ elements, and so on, until after a k-th transformation only one (diagonal element) remains nonzero. Similarly, all off-diagonal matrix elements of other columns may be eliminated. Numerous variations of these techniques are described below.

Advantages of the disclosed implementations include, but are not limited to, minimizing the depth of a network of quantum circuits that is used to implement a given quantum algorithm. Reduction in the depth of the network shortens paths through the network and reduces decoherence, making it easier to ensure that quantum coherence is maintained for a time that is sufficient for execution of the quantum algorithm. As a result, algorithms that cannot be executed on networks of quantum circuits identified using conventional decomposition methods may be implemented on networks compiled using techniques described in the instant disclosure. The disclosed techniques enable to minimize the longest path through any network of quantum circuit elements that may implement a given unitary transform. The implementations may be used in any suitable digital quantum computing systems (e.g., realized via qubits, qutrits, qudits, etc.) as well as in various analog quantum computing systems.

FIG. 1A illustrates an example system architecture 100, in accordance with one implementation of the present disclosure. The system architecture 100 includes a computing device 110, which may be connected to a network (not shown explicitly), such as a public network (e.g., the Internet), a private network (e.g., a local area network (LAN) or wide area network (WAN)), a wired network (e.g., Ethernet network), a wireless network, and/or a combination thereof.

The computing device 110 may include personal computers (PCs), laptops, mobile phones, smart phones, tablet computers, netbook computers, network-connected televisions, etc. The computing device 110 may include a depth-optimizing quantum compiler (DQC) 120, operating in accordance with implementations of the instance disclosure. In some implementations, the computing device 110 may receive a quantum algorithm 102, which may specify any combination of quantum operations to be performed on a set of N qubits (or qudits). In some implementations, the quantum algorithm 102 may be described by a unitary matrix U(N) 104. In some implementations, the computing device 110 may obtain the unitary matrix U(N) 104 based on the analysis of the operations of the quantum algorithm 102.

Computing device 110 may provide the matrix U(N) 104 to DQC 120. In some implementations, DQC 120 includes an efficient matrix decomposition module 122 operating as described below in conjunction with FIGS. 2A-E and FIG. 3. The efficient matrix decomposition module 122 may decompose (e.g., factorize) the matrix U(N) 104 into a product of matrices by performing a number of transformations. More specifically, the efficient matrix decomposition module 122 may identify M transformation matrices $T_j$ that, upon multiplication by the matrix U(N) 104, produce a diagonal matrix D:

$$T_M \times \ldots \times T_2 \times T_1 \times U(N) = D,$$

Correspondingly, the matrix U(N) 104 may be represented as the product, $$U(N) = T_1^{-1} \times T_2^{-1} \times \ldots \times T_M^{-1} \times D.$$

The efficient matrix decomposition module 122 identifies the transformation matrices in a way that optimizes the decomposition depth M+1, the total number of matrices used to represent the matrix U(N) 104. Each of the transformation matrices $T_j$ may include one or more (e.g., up to N/2) 2D rotations.

Using the representation of the matrix U(N) 104 obtained by the efficient matrix decomposition module 122, DQC 120 may obtain a circuit map 130 that realizes the obtained representation in actual physical (quantum) circuits. For example, a quantum circuit mapping module 124 may access quantum circuits characteristics 114 to identify what specific physical circuits are available for implementation of the quantum algorithm 102, such as optical circuits, superconducting Josephson circuits, trapped ions in optical lattices, nuclear magnetic resonance (spin) systems, quantum dot circuits, cavity quantum electrodynamic systems, *Majorana* fermions in quantum wires, or any other suitable (current or future) realization of computation with quantum states, e.g., using via qubits, qutrits, qudits, or analog quantum computing systems. Quantum circuit mapping module 124 may also identify specific physical interactions that are used to manipulate qubits (qudits). For example, qubits (qudits) may be implemented as coherent optical beams and the interactions of qubits (qudits) may be implemented via beam mixers, splitters, phase shifters, and so on. As another example, qubits (qudits) may be implemented as nuclear or electron spins and the interactions may be provided by magnetic fields or spin-orbital coupling of appropriate direction and duration.

Based on the obtained matrix decomposition and the type and characteristics of the available physical circuits, quantum circuit mapping module 124 may determine the number of qubits (qudits) that are to be used to implement the quantum algorithm 102, the arrangement of the qubits (qudits), a temporal and/or spatial character of interaction (entanglement) of the qubits (qudits), parameters of the manipulations that are to be applied to the qubits (qudits), and other information that constitutes the circuit map 130. For example, if optical circuits are used as a realization of the qubits (qudits), the circuit map 130 may include a topology of optical beam propagation and parameters of the optical devices to be used to manipulate and control the optical beams, such as amplitudes of transmission (and/or reflection) of the optical beams through (and/or from) various devices including optical films, reflectors, polarizers, phase shifters and the like. Similarly, in the instances of an analog quantum system being used, quantum circuit mapping module 124 may determine a specific configuration of the analog system that is to be used to implement the quantum algorithm 102 In some implementations, the circuit map 130 may then be provided to a quantum computing facility that includes a qubit assembly 170, which can be operated by a cloud quantum computing server, which prepares the actual physical realization using the available physical circuits, for execution of the quantum algorithm 102.

Operations of DQC 120 may be supported with one or more processors, such as central processing units (CPUs) 140, graphics processing units (GPUs) 150, or a combination thereof. "Processor" refers to a device capable of executing instructions encoding arithmetic, logical, or I/O operations. In one illustrative example, a processor may follow Von Neumann architectural model and may include one or more arithmetic logic units (ALUs), a control unit, and a plurality of registers. Processor(s) may be communicatively coupled to memory 160, which include a read-only memory (ROM), random-access memory (RAM), high-speed cache, or any other volatile and/or non-volatile memory capable of storing data.

FIG. 1B depicts an example system 101 for implementing a depth-optimized compiled quantum algorithm, in accordance with one implementation of the present disclosure. The example system 101 implements the systems, components, and techniques described below using a combination of classical and quantum computer programs operating on one or more classical computers and quantum computing devices in one or more locations. The example system 101 is intended to represent various forms of quantum computing devices. The components shown here, their connections and relationships, and their functions, are exemplary only, and do not limit implementations of the inventions described and/or claimed in this document.

The example system 101 includes a qubit assembly 170 and a control and measurement system 180. The qubit assembly 170 includes multiple qubits (or qudits), e.g., qubits 172 (or qudits), that are used to perform algorithmic operations or quantum computations. While the qubits shown in FIG. 1B are arranged in a rectangular array, this is a schematic depiction and is not intended to be limiting. The qubit assembly 170 also includes adjustable coupling elements 174 that allow for interactions between coupled qubits (qudits). In the schematic depiction of FIG. 1B, each qubit 172 (or qudits) is adjustably coupled to each of its four adjacent qubits (qudits) by means of respective coupling elements 174. In addition to an example arrangement of qubits 172 (or qudits) and coupling elements 174 illustrated in FIG. 1B, other arrangements are possible, including arrangements that are non-rectangular, arrangements that allow for coupling between non-adjacent qubits (or qudits), and arrangements that include adjustable coupling between more than two qubits (qudits). Coupling elements 174 between qubits 172 (or qudits) may be implemented using any suitable electrical, electromagnetic, optical, mechanical interaction between qubits (qudits). For example, ion traps can couple qubits via motion of the trapped particles along various directions in space. In some implementations, couplings between qubits (qudits) can be driven using a laser. Generally, the type of coupling elements 174 used depends on the type of qubits 172 (or qudits) used and/or the type of quantum computations to be performed.

Each qubit 172 (qudits) can be a physical two-level (multi-level) quantum system or device having quantum states representing logical values of 0 and 1 (2, 3, etc.). The specific physical realization of the multiple qubits 172 (qudits) and how they interact with one another is dependent on a variety of factors including the type of the quantum computing device included in example system 101 or the type of quantum computations that the quantum computing device is performing. For example, in an atomic quantum computer the qubits (qudits) may be realized via atomic, molecular or solid-state quantum systems, e.g., hyperfine atomic states. As another example, in a superconducting quantum computer, the qubits (qudits) may be realized via quantum phase, electric charge, or magnetic flux qubits (qudits). As another example, in a NMR quantum computer the qubits (qudits) may be realized via nuclear spin states.

In some implementations, the qubits 172 (or qudits) in the qubit assembly 170 can be frequency tuneable. In these examples, each qubit 172 (qudits) can have associated operating frequencies that can be adjusted through application of voltage pulses via one or more drive-lines coupled to the qubit (qudits). Example operating frequencies include qubit idling frequencies, qubit interaction frequencies, and qubit readout frequencies. Different frequencies correspond to different operations that the qubit (qudit) can perform. For example, setting the operating frequency to a corresponding idling frequency may put the qubit (qudit) into a state where it does not strongly interact with other qubits (qudits), and where it may be used to perform single-qubit (single-qudit) gates. As another example, in cases where qubits 172 (qudits) interact via coupling elements 174 with fixed coupling, qubits 172 (qudits) can be configured to interact with one another by setting their respective operating frequencies at some gate-dependent frequency detuning from their common interaction frequency. In other cases, e.g., when the qubits (qudits) interact via tuneable coupling elements 174, qubits 172 (qudits) can be configured to interact with one another by setting the parameters of their respective coupling elements 174 to enable interactions between the qubits 172 (qudits) and then by setting the qubit's (qudit's) respective operating frequencies at some gate-dependent frequency detuning from their common interaction frequency. Such interactions may be performed in order to perform multi-qubit (multi-qudit) gates.

The type of control signals 190 used depends on the physical realizations of the qubits (qudits). For example, the control signals may include RF or microwave pulses in an NMR or superconducting quantum computer system, or optical pulses in an atomic quantum computer system.

A quantum computation can be completed by measuring the states of the qubits (qudits), e.g., by performing a quantum measurement, as directed by respective control signals 190. The measurements cause readout signals 192 representing measurement results to be communicated back to control and measurement system 180. The readout signals 192 may include RF, microwave, or optical signals depending on the physical scheme for the quantum computing device and/or the qubits (qudits). For convenience, the control signals 190 and readout signals 192 shown in FIG. 1B are depicted as addressing only selected elements of the qubit assembly 170 (i.e. the leftmost and the rightmost columns), but during operation the control signals 190 and readout signals 192 can address each element in the qubit assembly 170.

The control and measurement system 180 is an example of a classical computer system that can be used to perform various operations on the qubit assembly 170. The control and measurement system 180 includes one or more classical processors, e.g., processor 184, one or more memories, e.g., memory 186, and one or more I/O units, e.g., I/O unit 182, connected by one or more data buses. The control and measurement system 180 can be programmed to send sequences of control signals 190 to the qubit assembly 170, e.g. to carry out a selected series of quantum operations, and to receive sequences of readout signals 192 from the qubit assembly 172, e.g. as part of performing measurement operations.

The processor 184 is configured to process instructions for execution within the control and measurement system 180. In some implementations, the processor 184 is a single-threaded processor. In other implementations, the processor 184 is a multi-threaded processor. The processor 184 is capable of processing instructions stored in the memory 186.

The memory 186 stores information within the control and measurement system 180. In some implementations, the memory 186 includes a computer-readable medium, a volatile memory unit, and/or a non-volatile memory unit. In some cases, the memory 186 can include storage devices capable of providing mass storage for the control and measurement system 180, e.g., a hard disk device, an optical disk device, a storage device that is shared over a network by multiple computing devices (e.g., a cloud storage device), and/or some other large capacity storage device.

The input/output unit 182 provides input/output operations for the control and measurement system 180. The input/output unit 182 can include D/A converters, A/D converters, and RF/microwave/optical signal generators, transmitters, and receivers, whereby to send control signals 190 to and receive readout signals 192 from the qubit assembly 170, as appropriate for the physical scheme for the quantum computer. In some implementations, the input/output unit 182 can also include one or more network interface devices, e.g., an Ethernet card, a serial communication device, e.g., an RS-232 port, and/or a wireless interface device, e.g., an 802.11 card. In some implementations, the input/output device 182 can include driver devices configured to receive input data and send output data to other external devices, e.g., keyboard, printer and display devices.

In some implementations, the control and measurement system 180 can be a part of computing device 110 of FIG. 1A. In some implementations, the control and measurement system 180 can be coupled to computing device 110. In some implementations, after DQC 120 of computing device 110 obtains a circuit map 130, the circuit map is provided to the control and measurement system 180 for actual physical realization on the qubit assembly 170. Processor 184 uses the provided circuit map 130 to effect a suitable arrangement of qubits 172 (qudits) and coupling elements 174 that realizes the circuit map on the qubit assembly 170 and provides control signals 190 to the qubit assembly 170 via the input/output unit 182. After completion of the quantum algorithm on the qubit assembly, processor 184 reads out the results of the quantum measurement using readout signals 192 via the input/output unit 182.

Although an example control and measurement system 180 has been depicted in FIG. 1B, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Figures 2A, 2B, 2C:
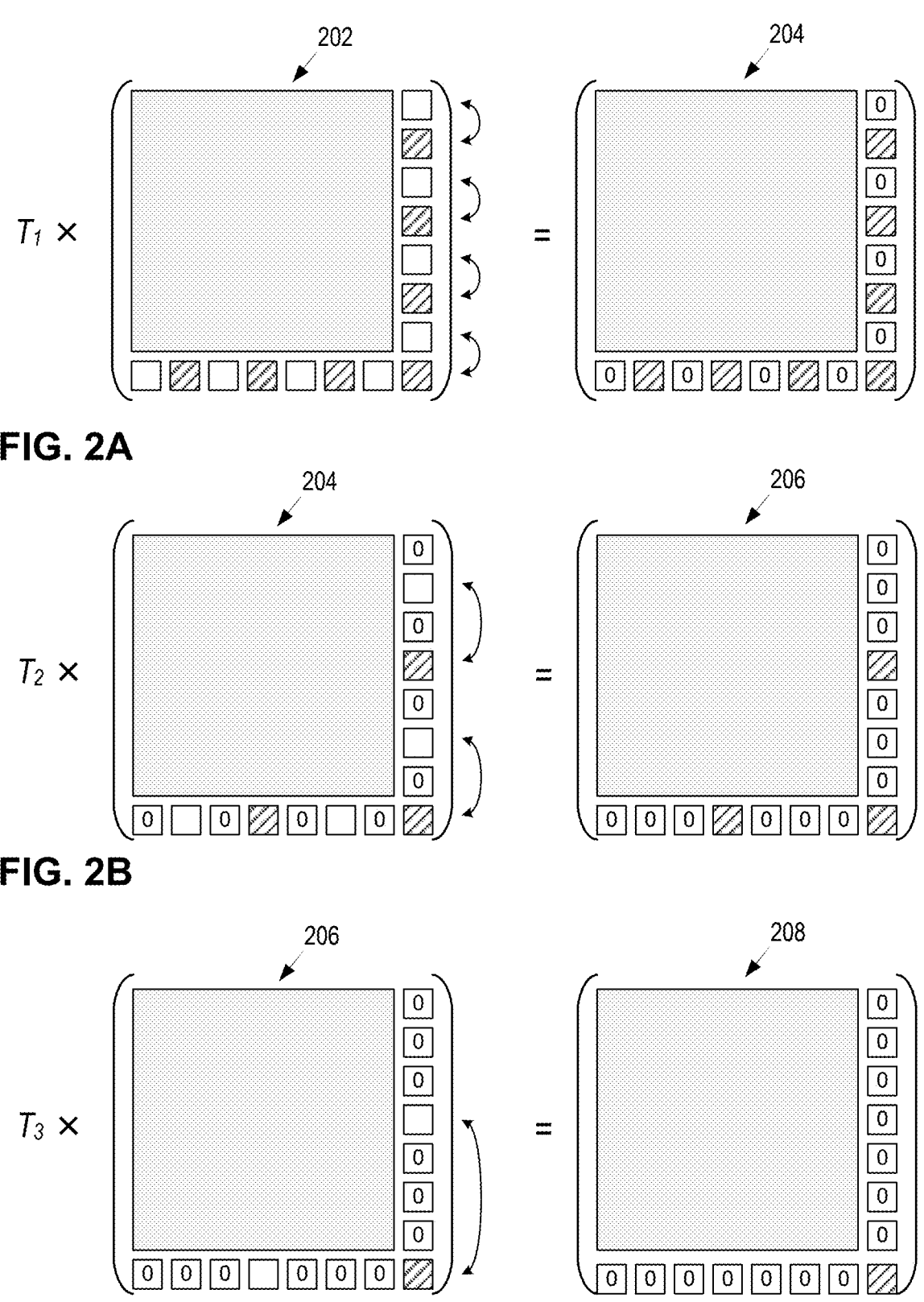
FIGS. 2A-E illustrate example operations of a depth-minimizing quantum compiler, in accordance with one implementation of the present disclosure.

FIGS. 2A-E illustrate example operations of a depth-minimizing quantum compiler, in accordance with one implementation of the present disclosure. FIG. 2A shows an initial matrix U 202 (which may be similar to matrix U(N) 104) undergoing a first transformation $T_1$. FIG. 2A depicts, for simplicity of viewing, an 8×8 matrix U, but it should be understood that matrices of any dimension may be transformed as described below. The last row and the last column of the matrix U are explicitly depicted with squares while the upper-left (N−1)×(N−1) block is shown with the shaded square. The first transformation $T_1$ is selected in such a way that each odd element of the last column (indicated with white squares) is turned to zero by leveraging the value of the even element (indicated with shaded squares) that is immediately below the respective odd element. The first transformation $T_1$ may be represented by a block-diagonal matrix of the form $$T_1 = \begin{pmatrix} A_{11} & A_{12} & 0 & 0 & 0 & 0 & 0 & 0 \\ A_{21} & A_{22} & 0 & 0 & 0 & 0 & 0 & 0 \\ 0 & 0 & B_{11} & B_{12} & 0 & 0 & 0 & 0 \\ 0 & 0 & B_{21} & B_{22} & 0 & 0 & 0 & 0 \\ 0 & 0 & 0 & 0 & C_{11} & C_{12} & 0 & 0 \\ 0 & 0 & 0 & 0 & C_{22} & C_{22} & 0 & 0 \\ 0 & 0 & 0 & 0 & 0 & 0 & D_{11} & D_{12} \\ 0 & 0 & 0 & 0 & 0 & 0 & D_{21} & D_{22} \end{pmatrix},$$

where coefficients in each 2×2 block (representing a corresponding 2D rotation, e.g., $A_{11}=A_{22}=t$, $A_{12}=re^{i\phi}$, $A_{21}=re^{-i\phi}$) are selected to eliminate a corresponding odd matrix element of the last column, e.g., $$A_{11}U_{1N}+A_{12}U_{2N}=0.$$

The last condition represents two equations (for the real part and for the imaginary part) that can be satisfied by an appropriate selection of parameters t and $\phi$. The output of the first multiplication is a matrix $U^{(1)}=T_1 \times U$ 204.

FIG. 2B shows the resulting matrix $U^{(1)}$ 204 undergoing a second transformation $T_2$. As depicted in FIG. 2B, similarly to how the first transformation $T_1$ leverages even-row elements $U_{2N}$, $U_{4N} \ldots$ , to eliminate odd-row elements of the resulting matrix $$U_{1N}^{(1)}, U_{3N}^{(1)} \ldots ,$$

a second transformation $T_2$ leverages every fourth row element $$U_{4N}^{(1)}, U_{8N}^{(1)} \ldots ,$$

to eliminate elements $$U_{2N}^{(1)}, U_{6N}^{(1)} \ldots ,$$

of the product matrix $U^{(2)}=T_2 \times U^{(1)}=T_2 \times T_1 \times U$ 206. The second transformation $T_2$ may be represented by the matrix of the form $$T_2 = \begin{pmatrix} 1 & 0 & 0 & 0 & 0 & 0 & 0 & 0 \\ 0 & F_{11} & 0 & F_{12} & 0 & 0 & 0 & 0 \\ 0 & 0 & 1 & 0 & 0 & 0 & 0 & 0 \\ 0 & F_{21} & 0 & F_{22} & 0 & 0 & 0 & 0 \\ 0 & 0 & 0 & 0 & 1 & 0 & 0 & 0 \\ 0 & 0 & 0 & 0 & 0 & G_{11} & 0 & G_{12} \\ 0 & 0 & 0 & 0 & 0 & 0 & 1 & 0 \\ 0 & 0 & 0 & 0 & 0 & G_{21} & 0 & G_{22} \end{pmatrix},$$

where coefficients $F_{jk}$ and $G_{jk}$ (representing the corresponding 2D rotations) are selected to eliminate the corresponding elements of matrix $U^{(1)}$ 204 (depicted with white squares), e.g., $$U_{2N}^{(2)} = F_{11} U_{2N}^{(1)} + F_{12} U_{4N}^{(1)} = 0,$$

and similarly for $$U_{6N}^{(1)}.$$

At the same time, the structure of the odd rows is such that the previously obtained zeros are passed through the second transformation unaffected.

FIG. 2C shows the next resulting matrix $U^{(2)}$ 206 undergoing a third transformation $T_3$. As depicted in FIG. 2C, the third transformation $T_3$ leverages every eighth element(s)

$$U_{8N}^{(2)},$$

(only one element shown for N=8) to eliminate element(s) of the resulting matrix $$U_{4N}^{(3)} \dots,$$

of the product matrix $U^{(3)} = T_3 \times U^{(2)} = T_3 \times T_2 \times T_1 \times U$ 208. The third transformation $T_3$ may be represented by the matrix of the form $$T_3 = \begin{pmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & H_{11} & 0 & 0 & H_{12} \\ 0 & 0 & 0 & 0 & 0 & 1 & 0 & 0 \\ 0 & 0 & 0 & 0 & 0 & 0 & 1 & 0 \\ 0 & 0 & 0 & 0 & H_{21} & 0 & 0 & H_{22} \end{pmatrix},$$

where coefficients $H_{jk}$ (representing the corresponding 2D rotations) are selected to eliminate the corresponding element of matrix $U^{(3)}$ 208 (depicted with a white square), e.g., $$U_{4N}^{(3)} = H_{11} U_{4N}^{(2)} + H_{12} U_{8N}^{(2)} = 0.$$

The resulting matrix $U^{(3)}$ 208 has zeros everywhere in the last column except in the last element $$U_{NN}^{(3)}.$$

Note that the elements of the last row are similarly eliminated, as follows automatically from the unitarity of the matrix $U^{(3)}$ 208. It should be understood that similar operations can be performed for a matrix of an arbitrary size U(N) to eliminate N−1 elements of the last column (and the last row).

Figure 2D:
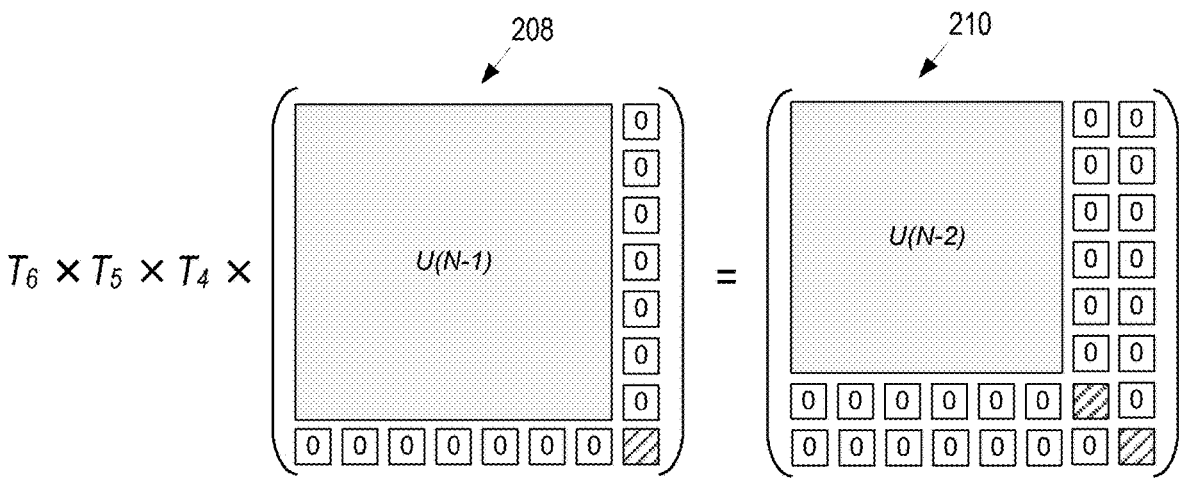
Figure 2E:
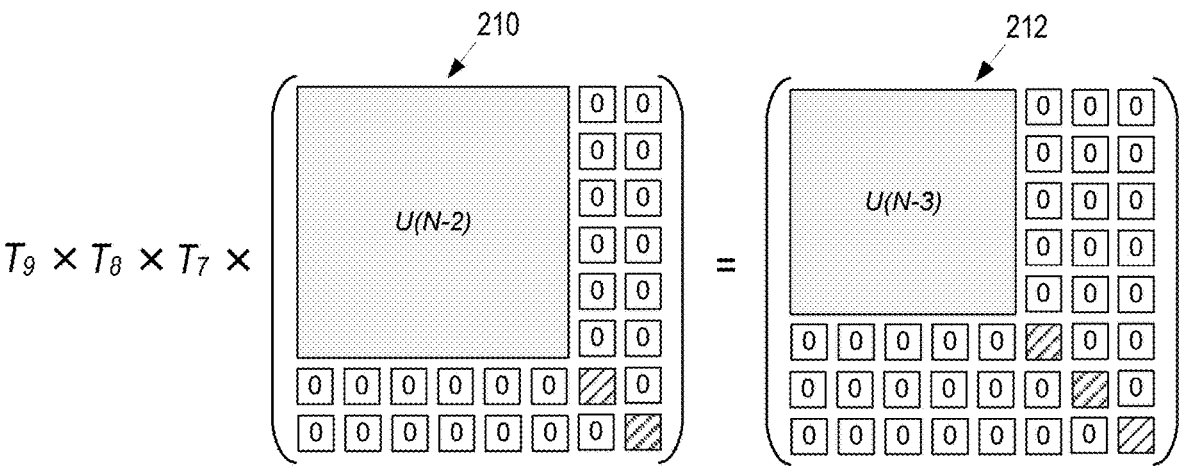

Transformations described in conjunction with FIGS. 2A-C illustrate effective reduction of the size of the unitary matrix from U(N) to U(N−1). FIGS. 2D-E illustrate subsequent recursive operations that reduce the size of the remaining matrix from U(N−1) 208 to U(N−2) 210, from U(N−2) 210 to U(N−3) 212, and so on, until only non-zero diagonal elements remain. For example, three transformations $T_4$, $T_5$, and $T_6$ may be used to reduce the size from $U^{(7)}$ to $U^{(6)}$ and three additional transformations $T_7$, $T_8$, and $T_9$ may be used to reduce the size from $U^{(6)}$ to $U^{(5)}$.

During various subsequent reductions, a matrix can have an even or an odd number of elements. When the number of elements is even, 2m, m elements may be eliminated by leveraging the remaining m elements, e.g., as described above in conjunction with FIG. 2A. When the number 2m−1 of elements is odd, m−1 elements may be eliminated by leveraging m−1 of the remaining elements while the last element is a pass-through element that is not affected by the current transformation matrix. In some implementations, when one or more of the elements of the last column (row) of a matrix are zero, the corresponding element may similarly be designated a pass-through element and no rotation is applied to such elements. Generally, 1 transformations may be used to reduce the matrix from dimension U(n) to U(n−1), where $2^{l-1} < n \leq 2^l$. Correspondingly, an arbitrary unitary matrix U(N) whose dimension is a power of two, $N=2^k$, is decomposed as a product of at most $$1 + \sum_{l=1}^{k} k 2^{k-1} = 2 + N \log_2(N/2)$$

matrices. For example, for N=8, the decomposition of a unitary matrix $U^{(8)}$ is achieved with 18 matrices (one diagonal matrix D and 17 transformation matrices $T_j$).

FIGS. 2A-C illustrate one possible implementation in which a nearest non-zero element is used to leverage elimination of a given matrix element during each transformation. It should be understood that such nearest-neighbor leveraging is not necessary. When n non-zero elements are present in the last column prior to a start of a given round of transformation, any n/2 (or (n−1)/2, if n is odd) elements may be eliminated by leveraging the other non-zero elements in any combination. For example, rather than eliminating elements $$U_{1N}^{(1)}, U_{3N}^{(1)}, U_{5N}^{(1)} \text{ and } U_{7N}^{(1)}$$

(by leveraging, respectively, elements $U_{2N}$, $U_{4N}$, $U_{6N}$ and $U_{8N}$), one may instead eliminate elements $$U_{1N}^{(1)}, U_{2N}^{(1)}, U_{4N}^{(1)} \text{ and } U_{6N}^{(1)}$$

(by/>leveraging, respectively, elements $U_{7N}$, $U_{3N}$, $U_{8N}$ and $U_{5N}$). In some implementations, prior to performing the elimination, an order of elements may be established or rearranged. For example, the element of the last column may be ranked by their magnitudes (absolute values) $|U_{jN}|$ and the elimination is performed in the increasing (or decreasing) order of the determined magnitudes. For example, the element of the largest (or the smallest) magnitude is eliminated by leveraging this element against the next largest (or the next smallest) element and so on. In some implementations, this ordering procedure can be performed once, with the order of elimination maintained throughout all subsequent elimination of elements of the same column. In some implementations, the remaining non-zero elements of the column are rearranged (reordered) after each transformation and the next round of eliminations is performed based on the obtained ordering. The ordering scheme described above ensures that elements of the similar magnitudes are being processed by each 2×2 block of 2D rotations. This reduces the likelihood that inputs elements of very different magnitudes would be processed by the same block. The benefit of operations performed on numbers of a similar magnitude includes an improved computations accuracy of the described techniques.

As a consequence of the transformations described in conjunction with FIGS. 2A-E, the product $T_M \times \ldots \times T_2 \times T_1 \times U(N) = D$ represents a diagonal matrix. Conversely, the matrix U(N) 104 is given by the product, $$\left( U(N) = T_1^{-1} \times T_2^{-1} \times \ldots \times T_M^{-1} \times D. \right)$$

Figures 3A, 3B:
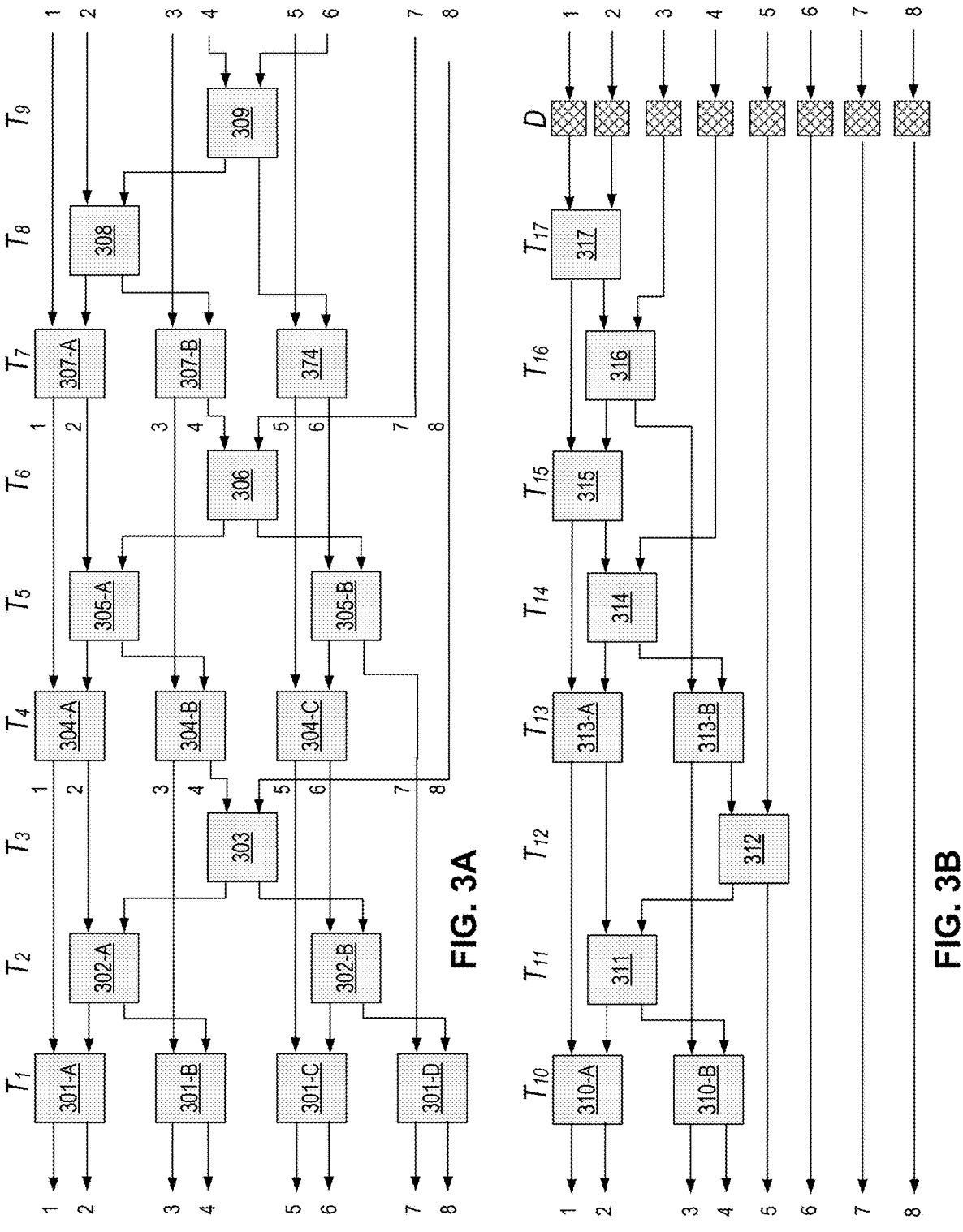
FIG. 3A and FIG. 3B illustrate an example physical realization of the decomposition of an 8×8 unitary matrix, in accordance with one implementation of the present disclosure.

FIG. 3A and FIG. 3B illustrate an example physical realization of the decomposition of an 8×8 unitary matrix, in accordance with one implementation of the present disclosure. FIG. 3A and FIG. 3B depict quantum circuits 301-317, each quantum circuits operating on two components of the entangled N-qubit quantum state and realizing a 2D rotation in the N-dimensional Hilbert space of the quantum system (N=8 in the example shown). Vector components of the quantum state are indicated with numerals 1, 2 . . . 8. For concreteness, the description below assumes that the quantum circuits 301-317 are optical circuits, but it should be understood that the physical realization depicted in FIG. 3A and FIG. 3B may correspond to any suitable quantum system, including but not limited to superconducting Josephson circuits, trapped ions in optical lattices, nuclear magnetic resonance (spin) systems, quantum dot circuits, cavity quantum electrodynamic systems, *Majorana fermions* in quantum wires, and so on. Solid arrows correspond to the direction of propagation of the corresponding optical beams. The labels $T_j$ identify the corresponding transformation matrices realized by the respective quantum circuits that are identified with numerals whose last two digits coincide with the transformation index j. Different circuits that are identified with the same numeral, e.g., 301, but different letters (e.g., 301-A, 301-B, etc.) realize different rotations of the same transformation matrix. For example, quantum circuits 301 A-D realize the first transformation matrix $T_1$, quantum circuits 302 A-B realize the second transformation matrix $T_2$, quantum circuit 303 realizes the third transformation matrix $T_3$, quantum circuits 304 A-C realize the fourth transformation matrix $T_4$, and so forth. Quantum circuits corresponding to the same transformation matrix $T_4$ represent the same layer of the network of quantum circuits. All operations of the same layer may be performed in parallel without waiting for outputs of other quantum circuits of the layer. On the other hand, at least some operations of a given (e.g., current) layer may have to wait until all some operation of a different (e.g., previous) layer is performed. For example, while operations of circuit 304-A may potentially be considered as part of the third layer (that includes circuit 303), operations of circuit 303 have to wait until operations of circuits 304-B and 304-C are complete. Circuits 303, 304-A, 304-B, and 304-C, therefore, represent two layers of the network of quantum circuits. The total depth of the network may thus be defined as the maximum number of circuits encountered by any path through the network.

The description above illustrates elimination of the last column (and the last row) of the matrix U at each iteration of decomposition. It should be understood that, in some implementations, the first column (and the first row) may be eliminated instead. In some implementations, the transformation matrices may by multiplied from the left (rather than from the right), e.g., $U(N) \times T_1 \times T_2 \times \ldots \times T_M = D$.

FIG. 3A depicts a realization of the first nine transformation matrices $T_1 \ldots T_9$ while FIG. 3B depicts a realization of the last seven transformation matrices (for N=8) $T_{10} \ldots T_{17}$ and the diagonal matrix D. The diagonal matrix D may be realized with N independent phase shifters (or other suitable circuits) depicted with small shaded squares. The optical beams pass through the network of optical circuits in the reverse order, from higher to lower indices j, as implied by the fact that the inverse matrices $$T_j^{-1}$$

are used in the decomposition $$U(N) = T_1^{-1} \times T_2^{-1} \times \ldots \times T_M^{-1} \times D.$$

Herein, the term "transformation matrix" is applied to the matrices $$T_j^{-1}$$

as well as matrices $T_j$.

The inputs 1, 2 . . . 8 into the quantum circuits of FIG. 3B may be inputs of the quantum algorithm 102. The outputs 1, 2 . . . 8 of the quantum circuits of FIG. 3B are also the respective inputs 1, 2 . . . 8 into the quantum circuits of FIG. 3A. The outputs 1, 2 . . . 8 of the quantum circuits of FIG. 3A represent the outputs of the quantum algorithm 102. (A subsequent measurement may be performed to determine the outputs of the quantum circuits.) The topology of the representation of the matrix U(N) 104 in terms of the quantum circuits (e.g., like the one depicted in the example illustration of FIG. 3A and FIG. 3B) as well as parameters of each quantum circuit may be output (e.g., by DQC 120) as part of the circuit map 130.

FIG. 4 depicts a flow diagram of an example method 400 of a depth-efficient compiling of a quantum algorithm, in accordance with some implementations of the present disclosure. Method 400 may be performed by a processing device that may include hardware (quantum circuits, classical processors, dedicated logic, etc.), software (such as is run on a general purpose computer system or a dedicated machine), or a combination of both. The processing device (e.g., on computing device 110 of FIG. 1) may include one or more central processing units (CPUs), graphics processing units (GPUs), field-programmable gate arrays (FPGAs), application-specific integrated circuits (ASICs), or the like, or any combination thereof. In one implementation, various operations of method 400 may be performed by modules and components of DQC 120 of FIG. 1, including efficient matrix decomposition module 122 and quantum circuit mapping module 124. Method 400 may be directed to compiling a quantum algorithm (e.g., quantum algorithm 102) for execution on a plurality of quantum circuits.

At block 410, the processing device performing method 400 may access the quantum algorithm. The quantum algorithm may be provided to the processing device over a network, downloaded from a cloud storage, or accessed at a local storage or memory device (e.g., memory 160 of FIG. 1). The quantum algorithm may be specified in any suitable form that describes a sequence of operations to be performed by the quantum circuits on any number of qubits (qudits). At block 420, method 400 may continue with the processing device identifying a matrix U associated with the quantum algorithm, e.g., a matrix that embodies all operations of the algorithm to be performed or any portion of such operations. The matrix U may be received as a block of complex numbers (elements of the matrix), as a set of column vectors, a set of row vectors, a column-wise or a row-wise list of complex numbers, or in any other suitable form. The complex numbers can be stored in a memory device, e.g., random-access memory or cache, accessible to the processing device performing method 400. The matrix associated with the quantum algorithm may be a unitary matrix U(N).

At block 430, method 400 may continue with the processing device determining a representation of the matrix U as a matrix decomposition that includes a plurality of transformation matrices (TMs). For example, the matrix decomposition, e.g., $$U = T_1^{-1} \times T_2^{-1} \times \ldots \times T_M^{-1} \times D,$$

may include any number (M) of transformation matrices $$T_j^{-1}$$

and may further include a diagonal matrix D. In some implementations, the matrix decomposition may have a form, e.g., $$U = D \times T_M^{-1} \times \ldots \times T_2^{-1} \times T_1^{-1},$$

in which the diagonal matrix D is multiplied by the transformation matrices on the right (rather than left). Each of the transformation matrices may perform at least one 2D rotation in the Hilbert space of a quantum system which is to be manipulated by the quantum circuits. Additionally, one or more of the transformation matrices may perform multiple instances of 2D rotations. In some implementations, the matrix U may be a square matrix of a dimension N×N, where N is even and the transformation matrices may include a transformation matrix (e.g., $T_1$ or, alternatively, $$T_1^{-1},$$

as illustrated in FIG. 2A and FIG. 3A for N=8) that performs N/2 instances of 2D rotations. In some implementations, N is odd and the transformation matrices include one or more transformation matrices that perform (N−1)/2 instances of 2D rotations. For example, if N=7, as illustrated in FIG. 2D, FIG. 2E, and a portion of FIG. 3A), the first transformations matrix to be applied may be $$T_4^{-1}$$

and both transformation matrices $$T_4^{-1} \text{ and } T_7^{-1}$$

may perform (N−1)/2=3 of 2D rotations each (more specifically, 2D rotations realized by quantum circuits 304-A, 304-B, and 304-C).

In some implementations, a subset of the plurality of transformation matrices may eliminate all non-diagonal elements of a first or a last column of the matrix associated with the quantum algorithm. For example, as illustrated in FIG. 2A, the subset of transformation matrices including $T_1$, $T_2$, or $T_3$ (or, alternatively, $$T_1^{-1}, T_2^{-1}, \text{ and } T_3^{-1}$$

eliminates all non-diagonal elements of the last column (and the last row) of matrix 202. The subset of such transformations may be a number of the transformation matrices that is no more than a binary logarithm of N+1:$\log_2(N+1)$. For example if N is even, the number of such transformations may be $\log_2 N$; if N is odd, the number of such transformations may be $\log_2(N+1)$. More specifically, as illustrated in FIG. 2D, in case of N=7, the number $\log_2(N+1)$=3 of transformation matrices may be used (e.g., matrices $T_4$, $T_5$, and $T_6$) to eliminate all non-diagonal elements of a respective column of matrix 210. In those instances, where some of the elements of the column are zero, no 2D rotations need to be performed for the respective elements and the number of 2D rotations can be lower than N/2 (or lower than (N−1)/2, if N is odd).

In some implementations, 2D rotations may be performed within adjacent rows of the matrix U. In some implementations, 2D rotations may be performed within pairs of rows of the matrix U that are selected in some other fashion. For example, each of the multiple instances of the 2D rotations of a first transformation matric (e.g., $T_1$ or, alternatively, $$T_1^{-1}$$

may be performed within pairs of rows selected based on a magnitude of each of the matrix elements of a predetermined partition of the matrix U. The predetermined partition may be one of a last (or first) column or a last (or first) row of the matrix U. For example, if N=8 and the magnitudes (e.g., absolute values of the respective complex numbers) of the last column elements are ranked, from highest to lowest, as $|U_{28}|$, $|U_{78}|$, $|U_{58}|$, $|U_{18}|$, $|U_{88}|$, $|U_{38}|$, $|U_{48}|$, $|U_{68}|$, the 2D rotations may be performed within rows 2 and 7, rows 5 and 1, rows 8 and 3, and rows 4 and 6. In some implementations, rotations may be performed within rows that have magnitudes of the last column elements that are staggered by N/2 (N/4, etc.), e.g., between rows 2 and 8, rows 7 and 3, rows 5 and 4, and rows 1 and 6, in this example. Various other rotation pairing schemes may be used.

At block 440, the processing device performing method 400 may generate a circuit map that maps execution of the matrix decomposition on the plurality of quantum circuits. In some implementations, as depicted by the callout portion of FIG. 4, generating a circuit map may include a number of operations. For example, at block 442, the processing device may generate, as part of the circuit map, an interconnected arrangement of the plurality of quantum circuits, each of the plurality of quantum circuits capable of performing one or more 2D rotations. FIG. 3A and FIG. 3B provide one non-limiting example of such an arrangement of quantum circuits 301-317. The interconnected arrangement may indicate the order of operations of the quantum circuits and the direction of data flows between the quantum circuits. At block 444, the processing device may further generate, as part of the circuit map, one or more parameters (settings) for each of the plurality of quantum circuits. For example, a first (or any other) quantum circuit of the plurality of quantum circuits may include an optical circuit that has a first input port, a second input port, a first output port, and a second output port. The one or more parameters for the first (or any other) quantum circuit may determine an amplitude for an optical beam, entering the optical circuit through the first input port, to exit the optical circuit through the first output port. Similarly, the one or more parameters for the first (or any other) quantum circuit may determine a phase shift acquired by the optical beam entering the optical circuit through the first input port and exiting the optical circuit through one of the first output port or the second output port.

FIG. 5 illustrates an example application 500 of a depth-efficient network of quantum circuits in machine learning, in accordance with some implementations of the present disclosure. Conventional machine-learning applications (e.g., decision-tree algorithms, neural networks, etc.) operate in a digital domain, with inputs (and outputs) having digital values and being processed using digital operations. Quantum circuits operating in accordance with implementations of the present disclosure open a possibility of analog-type machine learning applications in which complex quantum amplitudes represent continuous variables. Depicted in FIG. 5 is a coherent signal 502 that is incident on a signal filter that modifies the incident signal without destroying the signal's coherence. For the sake of concreteness, the example application 500 is assumed to be an object classification (recognition) application, coherent signal 502 is assumed to be an optical signal, and the signal filter is assumed to be an object 504 that is being classified (e.g., identified). It should be understood, however, that any other suitable applications may be executed in a similar way. Coherent signal 502 may be a plane wave signal (or a superposition of plane wave signals, e.g., of different wavelengths) having the same phase across the signal's wave front. In some implementations, the phase may be engineered (e.g., using diffractive optical elements and/or phase shifters) to have any suitable phase pattern $\phi_0(x, y)$. Upon interaction with the object 504, an optical signal 506 is produced having a different phase pattern $\phi(x, y)$. A phase pattern $\phi(x, y)$ may, generally, arise even if the incident phase is unpatterned $\phi_0$=const. Additionally, amplitude of the optical signal 506 may be modulated due to interaction with the object 504. The optical signal 506, e.g., a(x, y)$e^{i\phi(x,y)}$, may be characterized by both a spatial amplitude variation a(x, y) and a spatial phase variation $\phi(x, y)$ with coordinates of locations (x, y)—herein referred to as pixels—of the object 504 that generate the corresponding part of the optical signal 506. Although the optical signal 506 is depicted in FIG. 5 as a signal transmitted through the object 504, it should be understood that the optical signal 506 may be a signal reflected by the object 504. Likewise, even though the object 504 is depicted as a flat object, it should be understood that that the described implementations may be adjusted to classify three-dimensional objects, for example by using an additional coherent reference beam, as used in holography, and performing a quantum transform on the quantum amplitudes directly, rather than on the intensity information encoded in the hologram.

The optical signal 506 may be processed by a network of quantum circuits 508 (herein simply referred to as network 508), which may be a depth-efficient network, in one implementation. Network 508 may include any number of optical circuits (e.g., optical circuits 310-317) having trainable parameters, such as transmission/reflection amplitudes, phase shifts, etc.). The network 508 may output a processed signal 510, b(x, y)$e^{i\psi(x,y)}$, having a processed amplitude b(x, y) and a processed phase$\psi$(x, y). The processed signal may be input into an optical detector 512, which may be an array of coherent detectors capable of detecting a continuous phase $\psi$(x, y) for a discrete set of pixels. The optical detector 512 may detect the processed signal 510 and, in some implementations, produce a digital signal 514, which may be processed by a classifier 516. In some implementations, the classifier 516 may be a classical computer-based classifier that determines the type of the object 504. The network 508 may be trained, e.g., by backpropagation of classification errors through various layers (transformation matrices) of optical circuits and minimizing the classification errors for a number of objects 504 with known classification types.

Figure 6:
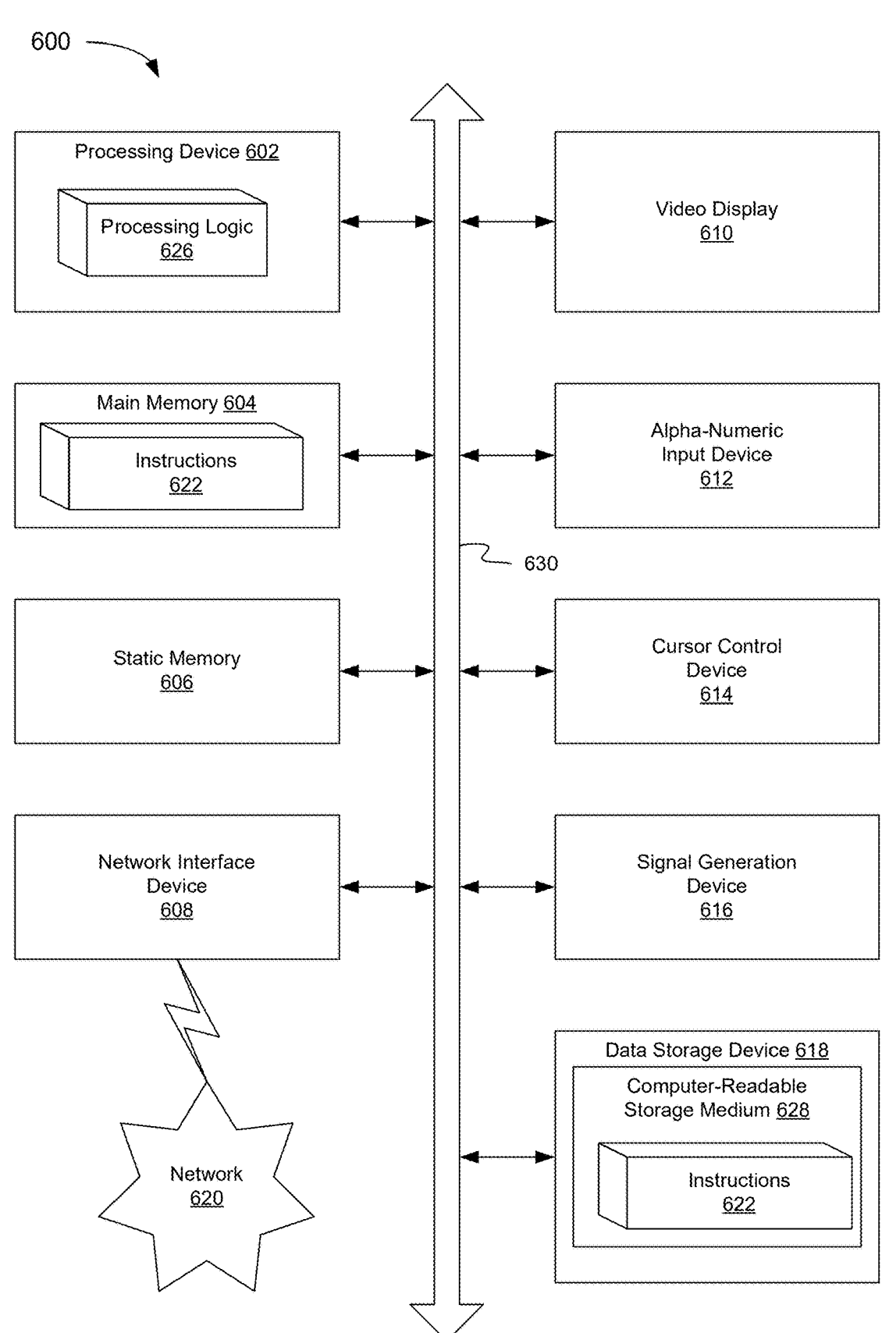
FIG. 6 depicts a block diagram of an example processing device operating in accordance with one or more aspects of the present disclosure.

FIG. 6 depicts a block diagram of an example processing device 600 operating in accordance with one or more aspects of the present disclosure. In one implementation, the processing device 600 may be a part of the computing device 110 of FIG. 1, e.g., CPU 140, GPU 150, or any combination thereof. Example processing device 600 may be connected to other processing devices in a LAN, an intranet, an extranet, and/or the Internet. The processing device 600 may be a personal computer (PC), a set-top box (STB), a server, a network router, switch or bridge, or any device capable of executing a set of instructions (sequential or otherwise) that specify actions to be taken by that device. Further, while only a single example processing device is illustrated, the term "processing device" shall also be taken to include any collection of processing devices (e.g., computers) that individually or jointly execute a set (or multiple sets) of instructions to perform any one or more of the methods discussed herein.

Example processing device 600 may include a processor 602 (e.g., a CPU), a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a secondary memory (e.g., a data storage device 618), which may communicate with each other via a bus 630.

Processor 602 represents one or more general-purpose processing devices such as a microprocessor, central processing unit, or the like. More particularly, processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 602 may also be one or more special-purpose processing devices such as an application specific integrated circuit (ASIC), a field programmable gate array (FPGA), a digital signal processor (DSP), network processor, or the like. In accordance with one or more aspects of the present disclosure, processor 602 may be configured to execute instructions implementing method 400 of a depth-efficient compiling of a quantum algorithm.

Example processing device 600 may further comprise a network interface device 608, which may be communicatively coupled to a network 620. Example processing device 600 may further comprise a video display 610 (e.g., a liquid crystal display (LCD), a touch screen, or a cathode ray tube (CRT)), an alphanumeric input device 612 (e.g., a keyboard), an input control device 614 (e.g., a cursor control device, a touch-screen control device, a mouse), and a signal generation device 616 (e.g., an acoustic speaker).

Data storage device 618 may include a computer-readable storage medium (or, more specifically, a non-transitory computer-readable storage medium) 628 on which is stored one or more sets of executable instructions 622. In accordance with one or more aspects of the present disclosure, executable instructions 622 may comprise executable instructions implementing method 400 of a depth-efficient compiling of a quantum algorithm.

Executable instructions 622 may also reside, completely or at least partially, within main memory 604 and/or within processor 602 during execution thereof by example processing device 600, main memory 604 and processor 602 also constituting computer-readable storage media. Executable instructions 622 may further be transmitted or received over a network via network interface device 608.

While the computer-readable storage medium 628 is shown in FIG. 6 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

It should be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

The implementations of methods, hardware, software, firmware or code set forth above may be implemented via instructions or code stored on a machine-accessible, machine readable, computer accessible, or computer readable medium which are executable by a processing element. "Memory" includes any mechanism that provides (i.e., stores and/or transmits) information in a form readable by a machine, such as a computer or electronic system. For example, "memory" includes random-access memory (RAM), such as static RAM (SRAM) or dynamic RAM (DRAM); ROM; magnetic or optical storage medium; flash memory devices; electrical storage devices; optical storage devices; acoustical storage devices, and any type of tangible machine-readable medium suitable for storing or transmitting electronic instructions or information in a form readable by a machine (e.g., a computer).

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation, implementation, and/or other exemplarily language does not necessarily refer to the same implementation or the same example, but may refer to different and distinct implementations, as well as potentially the same implementation.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computational systems"

may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits (qudits), or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit (qudit), i.e., a system that defines the unit of quantum information. It is understood that the term "qubit" encompasses all quantum systems that may be suitably approximated as a two-level system in the corresponding context. Similarly, "qudit" quantum systems may include multi-level systems, e.g., with three or more levels. By way of example, such systems can include atoms, electrons, photons, ions or superconducting qubits (qudits). In many implementations the computational basis states are identified with the ground and first excited states, however it is understood that other setups where the computational states are identified with higher level excited states are possible. The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits (qudits). Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semi-conductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of compiling a quantum algorithm for execution on a plurality of quantum circuits, the method comprising:
   accessing, by a processing device, the quantum algorithm;
   identifying, by the processing device, a matrix associated with the quantum algorithm;
   determining, by the processing device, a representation of the identified matrix as a matrix decomposition comprising a matrix product of the matrix and a plurality of transformation matrices (TMs), wherein each TM of at least a subset of one or more of the plurality of TMs performs multiple instances of complex two-dimensional (2D) rotations that reduce to zero multiple matrix elements of a common column of the matrix product;
   generating, by the processing device, a circuit map that maps execution of the matrix decomposition on the plurality of quantum circuits; and
   executing, using the circuit map, the quantum algorithm on the plurality of quantum circuits.

2. The method of claim 1, wherein the matrix associated with the quantum algorithm is a unitary matrix.

3. The method of claim 1, wherein the matrix associated with the quantum algorithm has a dimension N×N and wherein the plurality of TMs comprises a TM that performs one of: i) N/2 of the instances of 2D rotations, wherein Nis even, or ii) (N−1)/2 of the instances of 2D rotations, wherein Nis odd.

4. The method of claim 1, wherein the matrix associated with the quantum algorithm has a dimension N×N, wherein a subset of the plurality of TMs eliminates all non-diagonal elements of a first column or a last column of the matrix associated with the quantum algorithm, and wherein a first subset of the plurality of TMs has a number of TMs that is at most one more than a binary logarithm of N.

5. The method of claim 1, wherein each of the multiple instances of the 2D rotations of a first TM of the plurality of TMs is associated with a respective pair of rows of the first TM, and wherein the respective pair of rows is selected based on a magnitude of each of matrix elements of a predetermined partition of the matrix associated with the quantum algorithm.

6. The method of claim 5, wherein the predetermined partition is one of a first column, a last column, a first row, or a last row of i) the matrix associated with the quantum algorithm or ii) a rearranged matrix obtained by rearranging elements of the matrix associated with the quantum algorithm.

7. The method of claim 1, wherein the circuit map comprises an interconnected arrangement of the plurality of quantum circuits, each of the plurality of quantum circuits capable of performing one or more 2D rotations.

8. The method of claim 1, wherein the circuit map comprises one or more parameters for each of the plurality of quantum circuits.

9. The method of claim 8, wherein a first quantum circuit of the plurality of quantum circuits comprises an optical circuit having a first input port, a second input port, a first output port, and a second output port, and wherein the one or more parameters for the first quantum circuit determine at least:

an amplitude for an optical beam, entering the optical circuit through the first input port, to exit the optical circuit through the first output port; and a phase shift acquired by the optical beam entering the optical circuit through the first input port and exiting the optical circuit through one of the first output port or the second output port.

10. A system comprising:

a memory; and a processing device, communicatively coupled to the memory, configured to:

access a quantum algorithm;

identify a matrix associated with the quantum algorithm;

determine a representation of the identified matrix as a matrix decomposition comprising a matrix product of the matrix and a plurality of transformation matrices (TMs), wherein each $T_M$ of at least a subset of one or more of the plurality of TMs performs multiple instances of complex two-dimensional (2D) rotations that reduce to zero multiple matrix elements of a common column of the matrix product;

generate a circuit map that maps execution of the matrix decomposition on a plurality of quantum circuits; and execute, using the circuit map, the quantum algorithm on the plurality of quantum circuits.

11. The system of claim 10, wherein the matrix associated with the quantum algorithm has a dimension N×N and wherein the plurality of TMs comprises a TM that performs one of: i) N/2 of the instances of 2D rotations, wherein Nis even, or ii) (N−1)/2 of the instances of 2D rotations, wherein Nis odd.

12. The system of claim 10, wherein the matrix associated with the quantum algorithm has a dimension N×N, wherein a subset of the plurality of TMs eliminates all non-diagonal elements of a first column or a last column of the matrix associated with the quantum algorithm, and wherein the subset of the plurality of TMs has a number of TMs that is at most one more than a binary logarithm of N.

13. The system of claim 10, wherein each of the multiple instances of the 2D rotations of a first TM of the plurality of TMs is associated with a respective pair of rows of the first TM, and wherein the respective pair of rows is selected based on a magnitude of each of matrix elements of a predetermined partition of the matrix associated with the quantum algorithm.

14. The system of claim 13, wherein the predetermined partition of the first TM is one of a first column, a last column, a first row, or a last row of the matrix associated with the quantum algorithm.

15. The system of claim 10, wherein the circuit map comprises an interconnected arrangement of the plurality of quantum circuits, each of the plurality of quantum circuits capable of performing one or more 2D rotations.

16. The system of claim 10, wherein the circuit map comprises one or more parameters for each of the plurality of quantum circuits.

17. The system of claim 16, wherein a first quantum circuit of the plurality of quantum circuits comprises an optical circuit having a first input port, a second input port, a first output port, and a second output port, and wherein the one or more parameters for the first quantum circuit determine at least:

an amplitude for an optical beam, entering the optical circuit through the first input port, to exit the optical circuit through the first output port; and a phase shift acquired by the optical beam entering the optical circuit through the first input port and exiting the optical circuit through one of the first output port or the second output port.

18. The system of claim 10, wherein to identify the matrix associated with the quantum algorithm, the processing device is configured to access a plurality of elements of the matrix stored in the memory.

19. A non-transitory computer-readable medium to store instructions, which when executed by a processing device, cause the processing device to:

access a quantum algorithm;

identify a matrix associated with the quantum algorithm;

determine a representation of the identified matrix as a matrix decomposition comprising a matrix product of the matrix and a plurality of transformation matrices (TMs), wherein each TM of at least a subset of one or more of the plurality of TMs performs multiple instances of complex two-dimensional (2D) rotations that reduce to zero multiple matrix elements of a common column of the matrix product;

generate a circuit map that maps execution of the matrix decomposition on a plurality of quantum circuits; and execute, using the circuit map, the quantum algorithm on the plurality of quantum circuits.

20. The non-transitory computer-readable medium of claim 19, wherein the matrix associated with the quantum algorithm has a dimension N×N and wherein the plurality of TMs comprises a TM that performs one of: i) N/2 of the instances of 2D rotations, wherein Nis even, or ii) (N−1)/2 of the instances of 2D rotations, wherein Nis odd.

21. The non-transitory computer-readable medium of claim 19, wherein the circuit map comprises:

an interconnected arrangement of the plurality of quantum circuits, each of the plurality of quantum circuits capable of performing one or more 2D rotations, and one or more parameters for each of the plurality of quantum circuits.

* * * * *